United States Patent [19]
Pulli et al.

[11] Patent Number: 6,130,673
[45] Date of Patent: *Oct. 10, 2000

[54] EDITING A SURFACE

[75] Inventors: Kari A. Pulli, Seattle; John Michael Lounsbery, Bellevue, both of Wash.

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/839,349

[22] Filed: Apr. 18, 1997

[51] Int. Cl.$^7$ .................................................. G06F 13/00
[52] U.S. Cl. ......................... 345/428; 345/441; 345/429; 345/423
[58] Field of Search ..................... 345/429, 428, 345/423, 424, 442, 430, 419, 433

[56] References Cited

U.S. PATENT DOCUMENTS

| | | | |
|---|---|---|---|
| 5,367,615 | 11/1994 | Economy et al. | 345/429 |
| 5,473,739 | 12/1995 | Hsu | 345/434 |
| 5,544,291 | 8/1996 | Gilley et al. | 345/423 |
| 5,602,979 | 2/1997 | Loop | 345/423 |
| 5,739,822 | 4/1998 | Paradine | 345/419 |

OTHER PUBLICATIONS

Adam Finkelstein et al., "Multiresolution Curves," Proceedings of SIGGRAPH '94, Jul. 1994, pp. 261–268 1994, pp. 261–268.

James D. Foley et al., Computer Graphics Principles and Practice, Second Edition in C, Addison–Wesley Publishing Co., Reading, MA, 1997, Chapter 11, "Representing Curves and Surfaces", pp. 471–531.

David R. Forsey et al., "Hierarchical B–Spline Refinement," Computer Graphics, vol. 22, No. 4, Proceedings of SIGGRAPH '88, Aug. 1988, pp. 205–212.

Mark Halstead et al., "Efficient, Fair Interpolation Using Catmull–Clark Surfaces", Computer Graphics Proceedings, Annual Conference Series, 1993, pp. 35–40.

Hugues Hoppe et al., "Piecewise Smooth Surface Reconstruction", Computer Graphics Proceedings, Annual Conference Series, 1994, pp. 295–302.

Tsuneya Kurihara, "Interactive Surface Design Using Recursive Subdivision", Proc. Communicating With Virtual Worlds, Springer–Verlag, Jun. 1993, pp. 228–243.

Kari Pulli et al., "Hierarchical Editing and Rendering of Subdivision Surfaces", University of Washington Computer Sci. & Engr. Dept., http://www.cs.washington.edu/research/tr/tr–by–date.html, Document No. 97–04–07.

Denis Zorin et al., "Interpolating Subdivision for Meshes With Arbitrary Topology", Proceedings of SIGGRAPH '96, Aug. 1996, pp. 189–192.

Denis Zorin et al., "Interactive Multiresolution Mesh Editing,", Proceedings of SIGGRAPH '97, Aug. 1997 pp. 259–268.

*Primary Examiner*—Raymond J. Bayerl
*Assistant Examiner*—Tadesse Hailu
*Attorney, Agent, or Firm*—Staas & Halsey LLP

[57] ABSTRACT

A computer implemented method edits a surface by displaying a surface rendered from a polygonal mesh defined by mesh elements, selecting, as an edit mesh element, a mesh element displayed in the surface, determining a set of affected mesh elements from the polygonal mesh wherein each affected mesh element is within a specified vicinity of the edit mesh element, editing the edit mesh element in response to user input, and editing the affected mesh elements based on the edited edit mesh element.

41 Claims, 8 Drawing Sheets

EDITING A SURFACE

BACKGROUND

The invention relates to editing a surface in a computer system.

A polygonal mesh is a set of vertices and connecting edges forming polygonal planar surfaces, and is used in computer graphics for modeling a three-dimensional surface. A surface is rendered from an underlying polygonal mesh by applying a subdivision scheme that refines the mesh and computes new vertex locations as affine combinations of neighboring vertices. The accuracy of the surface created using the subdivision scheme depends on the accuracy with which the polygonal mesh represents the original surface.

Because it has planar surfaces, a polygonal mesh can only approximate a curved surface, although the difference between the polygonal mesh and a curved surface can be made arbitrarily small by using a sufficiently large number of polygonal surfaces. A polygonal mesh having a greater number of polygons, however, requires increased memory storage and processing.

SUMMARY

In general, in one aspect, the invention features a computer implemented method for editing a surface by displaying a surface rendered from a polygonal mesh defined by mesh elements, selecting, as an edit mesh element, a mesh element displayed in the surface, determining a set of affected mesh elements from the polygonal mesh, wherein each affected mesh element is within a specified vicinity of the edit mesh element, editing the edit mesh element in response to user input, and editing the affected mesh elements based on the edited edit mesh element.

Certain implementations of the invention include one or more of the following features. The mesh element is a vertex. The edit mesh element may be selected in response to user input.

The method further includes updating the displayed surface to reflect the edited mesh elements of the polygonal mesh. For example, the method may define an edit portion of the polygonal mesh including the edited mesh elements, re-render a portion of the surface corresponding to the edit portion of the polygonal mesh, and update the displayed surface by including the re-rendered portion. Re-rendering the portion of the surface may include performing an irregular tessellation of at least part of the re-rendered portion.

The polygonal mesh is defined by mesh elements at specified levels of detail and the method further includes determining an edit level, wherein the edit mesh element and the affected mesh elements are mesh elements of at least the edit level. The affected mesh elements may include mesh elements drawn from a finer level of detail than the edit level, and the affected mesh elements from the finer level may be within a smaller vicinity contained within the specified vicinity. Determining the affected mesh elements from the finer level within the smaller vicinity further includes determining whether mesh elements from the polygonal mesh at the finer level exist within the smaller vicinity and if such mesh elements do not exist, creating such mesh elements and adding the created mesh elements to the polygonal mesh.

The surface rendered from the polygonal mesh may displayed at the edit level, the method further including highlighting the mesh elements at the edit level displayed in the rendered surface.

The method further includes receiving user input defining a new position for the edit mesh element, wherein editing the edit mesh element in response to user input reposition the edit mesh element to the user-defined new position, and editing the affected mesh elements reposition the affected mesh elements based on the new position of the edit mesh element. Repositioning the affected mesh elements may be based on a predetermined function.

Each mesh element has a continuity type, the method further includes receiving user input defining a new continuity type for the edit mesh element, wherein editing the edit mesh element in response to user input sets a continuity type of edit mesh element to the user-defined continuity type, and editing the affected mesh element sets a continuity type for the affected mesh element based on the new continuity type of the edit mesh element.

The polygonal mesh may be comprised of, for example, a set of connected triangles or a set of connected quads.

In general, in another aspect, the invention features a memory device storing computer-readable instructions for use in a computer system for editing a surface using methods such as those described above.

The advantages of the invention may include one or more of the following. Hierarchical editing allows a surface to be modeled by a greater number of polygons in finely detailed areas and a smaller number in smooth areas, enabling efficient storage and processing of the surface. A user may intuitively edit a polygonal mesh modeling a surface without understanding the mathematics of the subdivision process. A user may specify discontinuities such as creases without forming complex trims. A user may edit a polygonal mesh at a coarse level, and previous edits made at a finer detail will automatically be adapted to the coarser edits. Thus, changes to the underlying shape of a portion of the surface preserve existing details of that portion.

An entire surface can be modeled using a single polygonal mesh rather than, for example, a collection of spline patches, which requires additional work to ensure that the patches blend seamlessly together and stay that way when the underlying model is altered, such as during animation.

Other features and advantages of the invention will become apparent from the following description and from the claims.

DESCRIPTION

Figure 1:
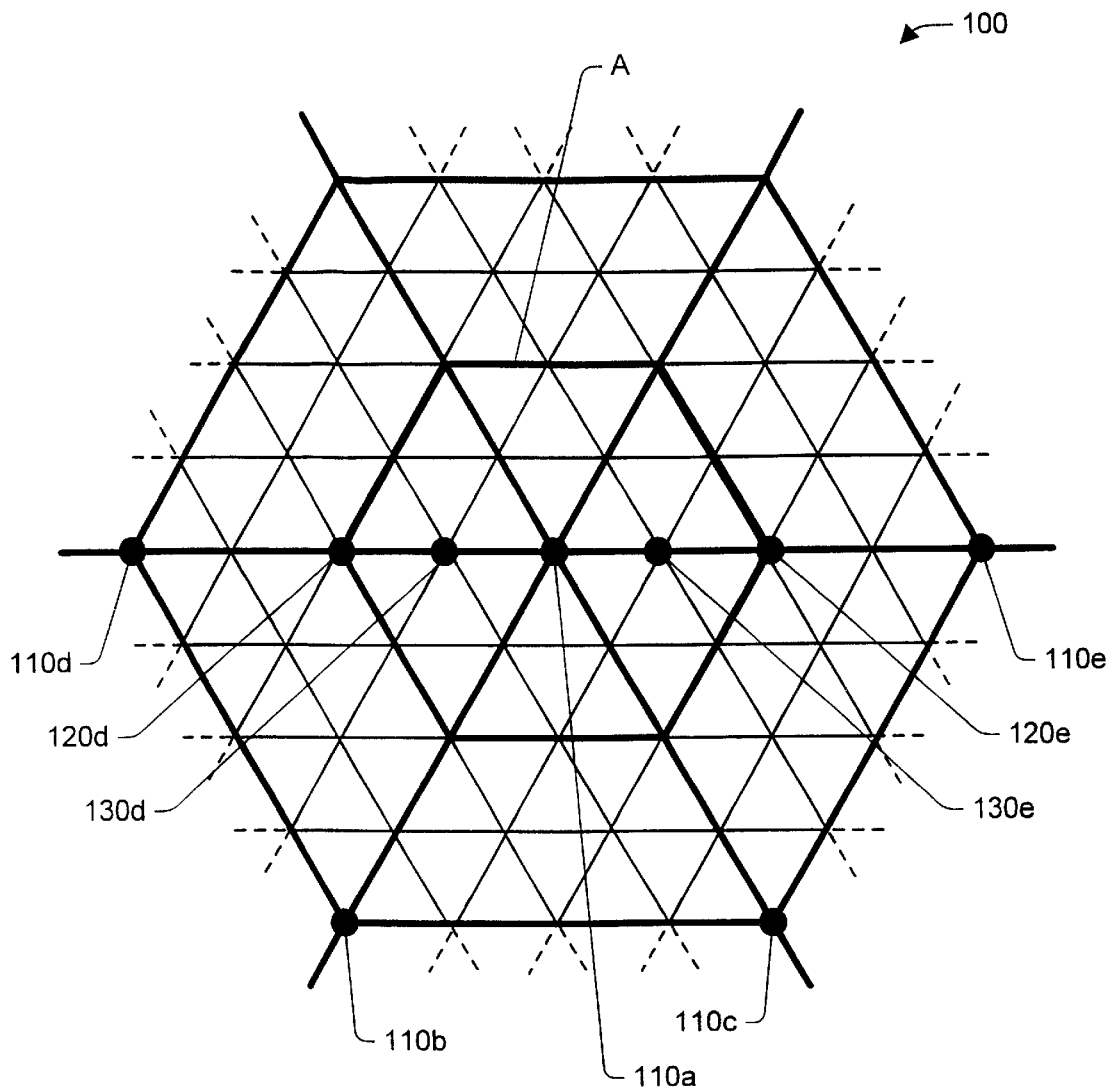
FIGS. 1 and 2a–2c illustrate a portion of a polygonal mesh.

FIG. 1 illustrates a portion of a polygonal mesh 100, a set of connected polygons, generally of the same shape, representing a three-dimensional surface in two dimensions. A polygonal mesh may have multiple levels of detail, with deeper levels being created by a subdivision scheme.

Subdivision schemes typically divide a polygon in a polygonal mesh into polygons of the same shape but smaller size. For example, the mesh 100 represented in FIG. 1 shows a set of connected triangles created using a subdivision scheme that divides a larger triangle into four smaller triangles having the same shape as their parent triangle. A polygonal mesh may be based on shapes other than triangles, such as quads (four-sided polygons), and a subdivision scheme may be adapted for various shapes.

Figure 2A:
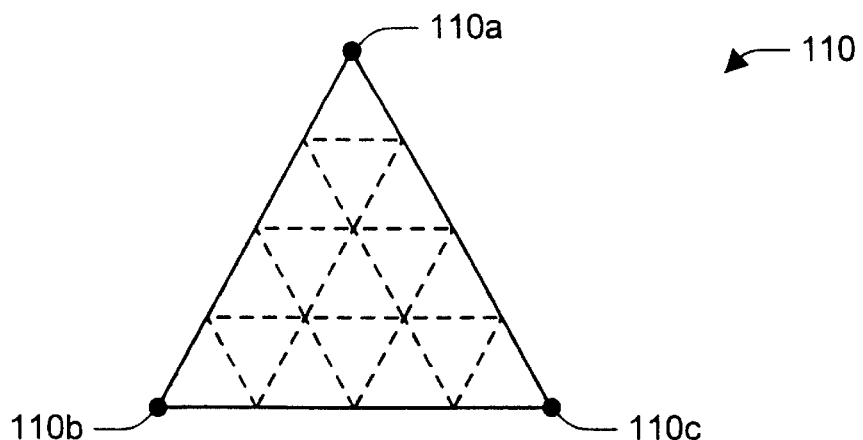
Figure 2B:
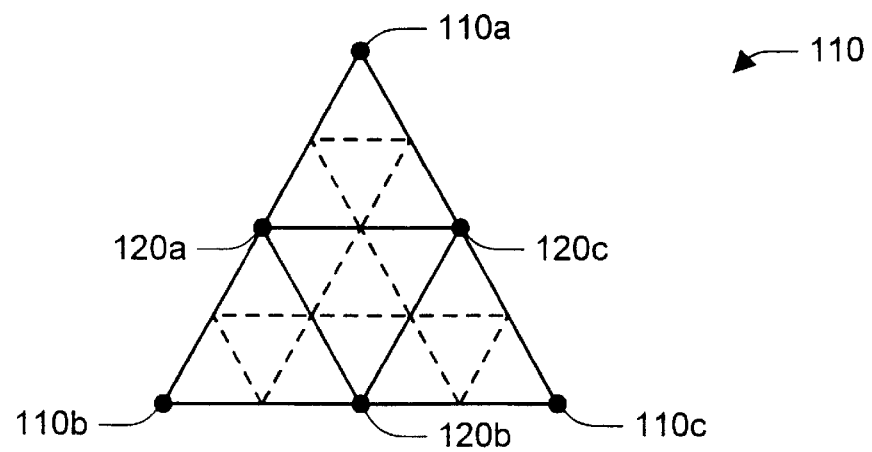
Figure 2C:
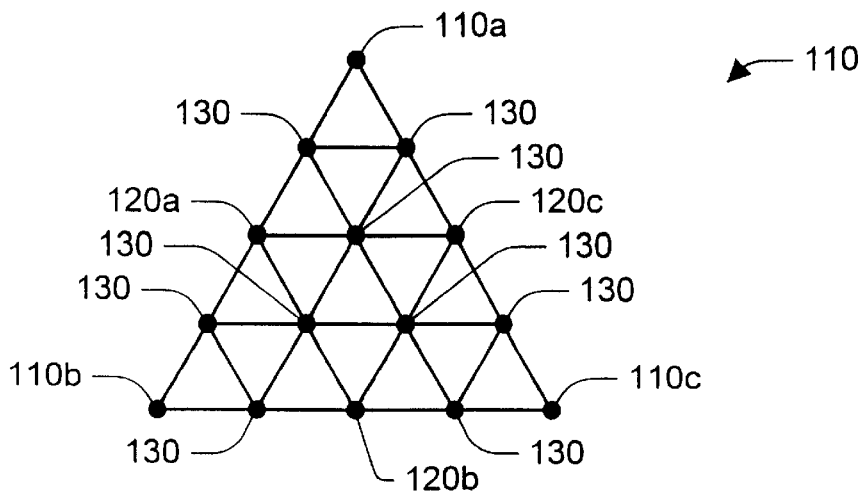

In general, deeper levels of detail describe the surface represented by a polygonal mesh in greater detail. FIGS. 2a–2c show a polygon 110 of FIG. 1 in greater detail. The polygon 110 defined by vertices 110a–110c in FIG. 2a is represented at a first level of detail. Polygon 110 is subdivided to create the polygons defined by vertices 110a–110c and 120a–120c in FIG. 2b, which are represented at a second level of detail. The polygons of FIG. 2b are subdivided again to create the polygons defined by vertices 110a–110c, 120a–120c, and 130 in FIG. 2c, which are represented at a third level of detail. A polygon that is subdivided is the parent polygon of the descendant polygons created by the subdivision.

An edge of a polygon has the same level as that polygon and is defined by the two vertices it connects. A descendant edge of an edge of a polygon p is a portion of the parent edge that forms an edge of a descendant of polygon p. The continuity type of an edge may be smooth or sharp (an example of a sharp edge is a $C^0$ continuous crease between smooth sections), and the type of a parent edge is typically inherited by its descendant edges. (A curve described as $C^n$ continuous at a point p indicates that the direction and magnitude of the nth derivative at point p are equal for the two segments of the curve joined at point p.) By default, an edge type is typically smooth.

A vertex of a polygon also has the same level as that polygon. Thus, as part of polygon 110 shown in FIG. 2a, vertices 110a–c have a level 1. Similarly, as part of the level 2 polygons shown in FIG. 2b, vertices 110a–c and 120a–c have a level 2, and as part of the level 3 polygons shown in FIG. 2c, vertices 110a–c, 120a–c, and 130 have a level 3. This example illustrates that a vertex may have more than one level. For example, vertex 110a has levels 1, 2, and 3.

The vertices of a parent polygon are parent vertices to descendant vertices created as a result of subdividing the parent polygon. For example, with reference to FIG. 2b, each of vertices 120a–120c created as a result of subdividing parent polygon 110 is a descendant vertex of each of the three parent vertices 110a–110c.

Figure 3:
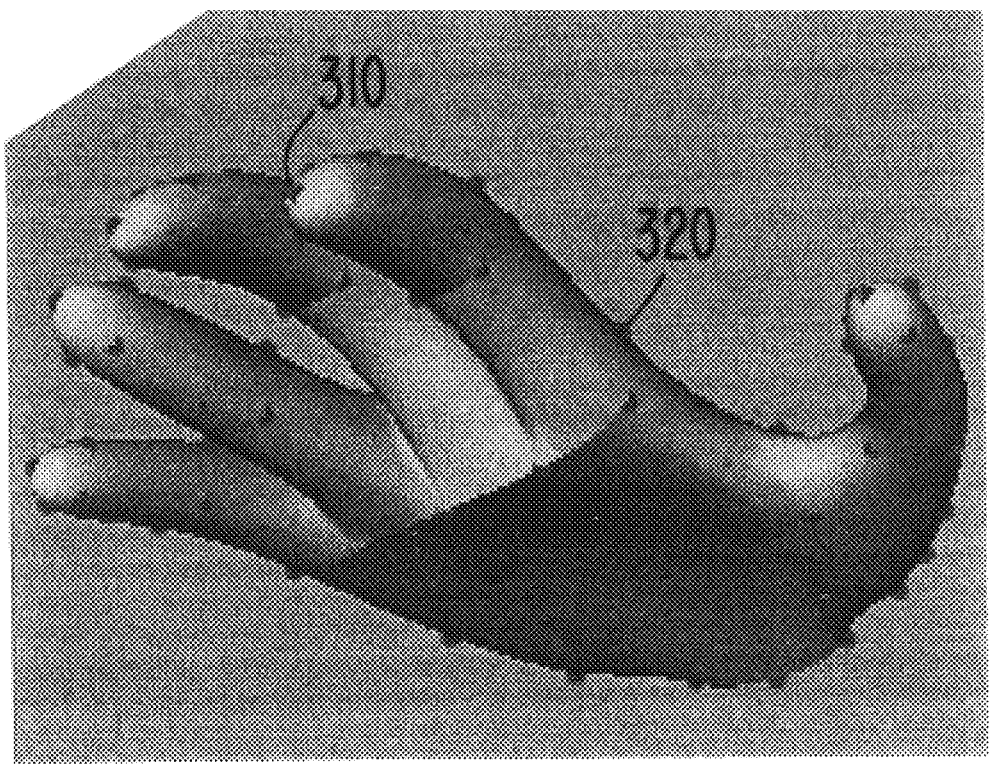
FIG. 3 illustrates a subdivision surface.

Each vertex has a continuity type, typically derived from the types of its incident edges at its level. For example, referring to FIG. 3, most vertices such as vertex 310 at the tip of the index finger, are smooth vertices, which are vertices surrounded by smooth incident edges. Vertices are generally smooth by default. A cusp vertex is a single point of $C^0$ continuity surrounded by areas of $C^2$ continuity, such as a tip of a cone. A dart vertex is a vertex having a single incident sharp edge. Vertex 320 at the end of the crease along the top of the palm is an example of a dart vertex. A corner vertex is a vertex having at least three sharp incident edges, such as the corner of a box. As with edges, by default, a vertex is generally smooth.

Various implementations are available to represent a polygonal mesh in a computer system. For example, a polygonal mesh may be represented by a set of vertices, a set of edges connecting the vertices, and a set of polygons defined by the edges. Details of finer levels of the same mesh may be hierarchically stored within the polygons of the coarser mesh. For example, after subdividing a polygon into four smaller polygons, the polygon of the coarser level may store pointers to information defining the four finer level polygons. Thus, a possible data structure for a polygon stores its level, its edges and their continuity types, its vertices, and pointers to its existing parent and descendant polygons, and neighboring polygons of the same level. A possible data structure for a vertex may store information such as the vertex position, level, continuity type, its incident edges and their continuity types, and pointers to polygons of its level for which it is a vertex.

A vertex position may be stored in a global or local frame of reference; the choice affects the method by which a vertex position is repositioned as the result of an edit.

As noted above, a vertex in a specific position may exist at more than one level. A vertex may be represented by separate data structures at each level at which it exists (for example, vertex 110a shown in FIGS. 2a–2c may be stored as a first level vertex, a second level vertex, and a third level vertex), or a different scheme may be implemented, for example, to represent a vertex fewer than the full number of levels at which it exists.

Figure 4:
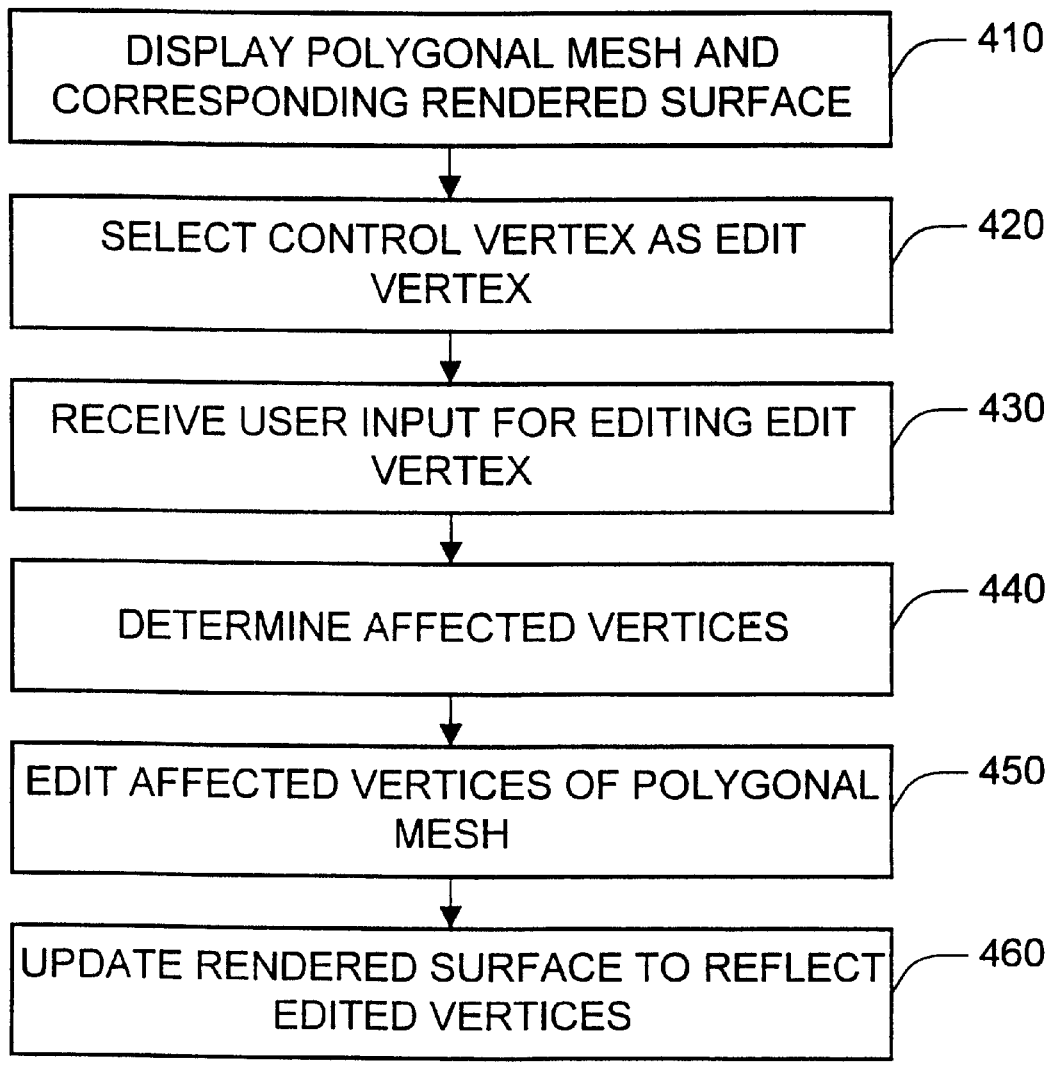
FIG. 4 is a flow diagram for editing a polygonal mesh.

Referring to the flow chart of FIG. 4, a polygonal mesh is displayed for editing (step 410). The initial polygonal mesh to be edited, referred to as the base mesh, may be created using an appropriate application such as PowerAnimator 8.0®, available from Silicon Graphics, Inc. of Mountain View, Calif.

The mesh may be displayed for editing at a user-specified level of detail. For example, if the polygon 110 of FIG. 2a is edited at level 1, it may be displayed as shown in FIG. 2a, with the level 1 vertices emphasized. FIGS. 2b and 2c respectively show the same polygon 110 as it would be displayed if edited at levels 2 and 3. The displayed mesh is referred to as a control mesh, and the emphasized vertices at the edit level are referred to as control vertices.

Figure 5A:
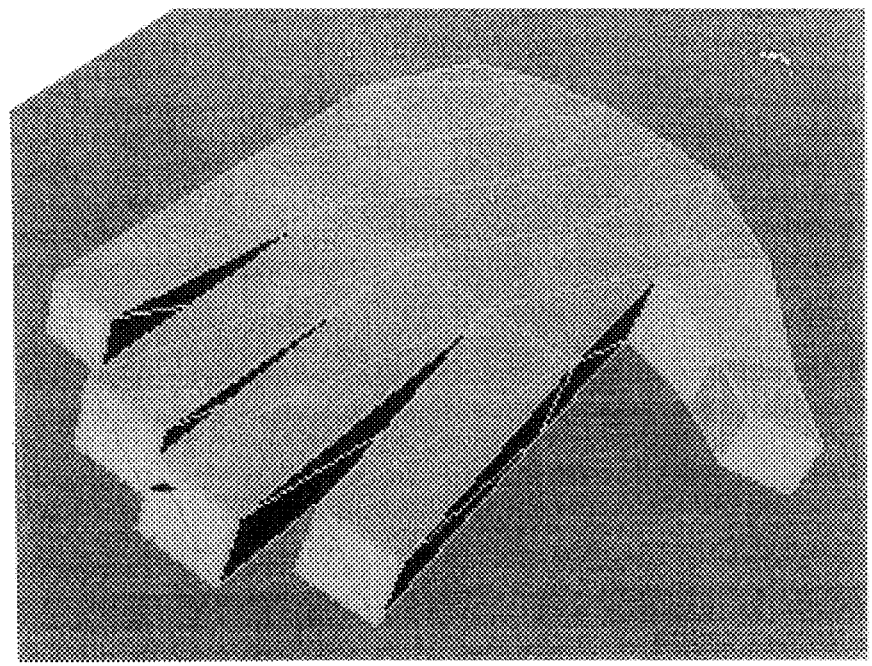
FIGS. 5a and 5b illustrate a subdivision surface and its underlying polygonal mesh.

A subdivision surface rendered from the polygonal mesh may be displayed concurrently with the polygonal mesh, providing real time visual feedback showing the effects of edits to the mesh on the rendered surface. For example, the polygonal mesh of FIG. 5a and the subdivision surface shown in FIG. 5b rendered from the mesh of FIG. 5a may both be displayed during editing.

Figure 5B:
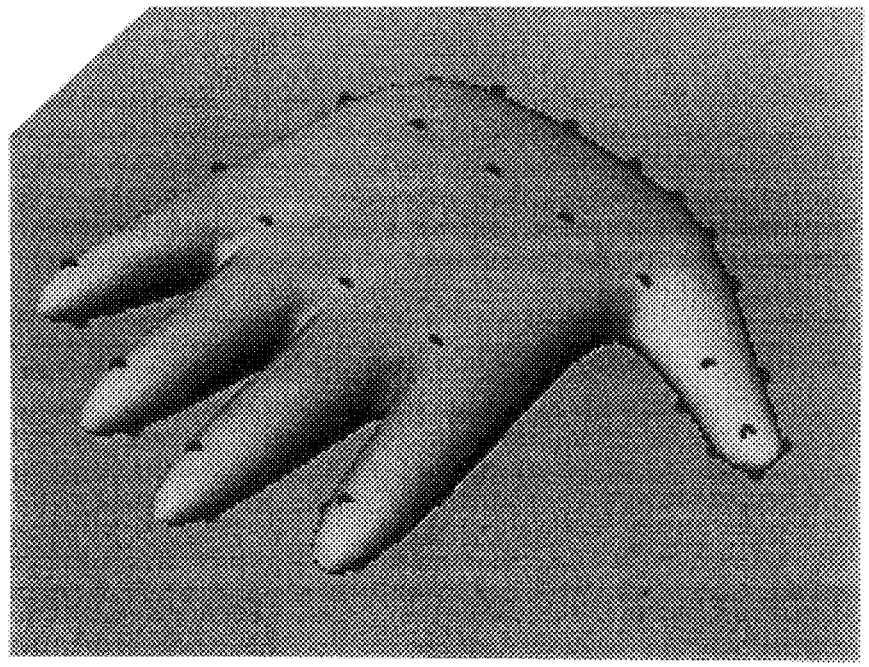

As shown in FIG. 5b, with the polygonal mesh, the control vertices may be highlighted in the subdivision surface. However, the positions of the control vertices may need to be adjusted from their positions represented in the polygonal mesh so that they are displayed as points on the displayed surface. Thus, each control vertex is represented as having two associated positions: a control position representing the vertex position in the polygonal mesh, and a display position representing the vertex position as it is displayed in the surface rendered from the control mesh. The adjustment method may vary depending on the continuity desired at the control vertices, and may be based, for example, on techniques described in C. Loop, Smooth Subdivision Surfaces Based on Triangles (1987) (Masters thesis, University of Utah) and J. Schweitzer, Analysis and Application of Subdivision Surfaces (1996) (Ph.D. dissertation, University of Washington), both of which are incorporated by reference. These techniques calculate a display position of a control vertex as a weighted average of its own control position and the control positions of neighboring control vertices, and the referenced papers describe methods of determining specific weights to achieve specific desired effects.

To edit the surface, the user selects a control vertex as an edit vertex (step 420). This may be accomplished, for example, by manipulating an input device such as a mouse to select one of the control vertices. If both a polygonal mesh and its rendered subdivision surface are displayed to a user, the user may select a control vertex from either displayed image.

The user may edit the edit vertex by, for example, changing its continuity type or the continuity type of any of its incident edges (step 430). A set of rules defining the continuity relationships between vertices and edges may be provided as desired for specific applications. For example, a set of rules may specify that a change in continuity type of an edited edge is inherited by descendant edges, and each vertex of those edges may be redefined depending on the types of its incident edges, as described above (steps 440 and 450).

The user may also edit the edit vertex by changing its position (step 430). When a user moves the edit vertex to a new position, that new position is assigned as its display position. However, to display the edit vertex at the new display position, its control position may need to be adjusted. A weighted sum technique such as those described in the above-referenced papers by C. Loop and J. Schweitzer, may be used to calculate a new control position based on the desired display position and the known control positions of neighboring control vertices. For each repositioned vertex, an edit offset is calculated to reflect the edit. For example, an edit offset may be a displacement vector from the old control position of the repositioned vertex to its new control position.

Repositioning the edit vertex also affects the positions of vertices within a limited vicinity of the surface. The size of the vicinity reflects the edit level: repositioning a vertex at a fine level affects a relatively small vicinity while editing at a coarse level affects a comparatively large vicinity.

The specific vertices affected (step 440) may be varied as desired for specific applications. As an example, the desired effect of repositioning a smooth vertex may be to show a gradual surface change in the vicinity surrounding the repositioned vertex. This may be achieved by repositioning the vertices within a surrounding vicinity of the repositioned vertex according to a function such as that illustrated in FIG. 6*a*.

Figure 6A:
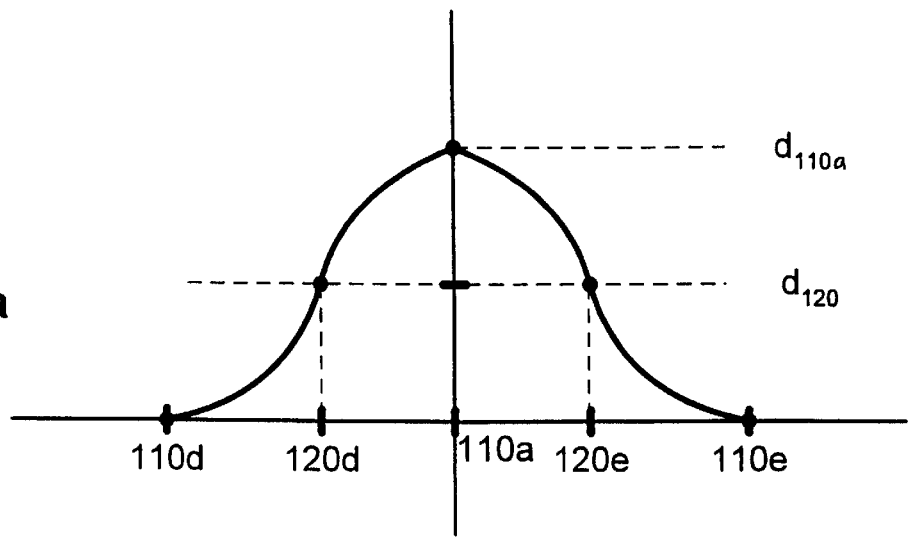
FIGS. 6a and 6b illustrate functions.

FIG. 6*a* shows a function applied to an edit to control vertex 110*a* of FIG. 1, where the edit level is such that vertices 110*d*, 120*d*, 110*a*, 120*e*, and 110*e* are control vertices. The x-axis represents the surrounding vicinity affected by editing a control vertex—in this example, the vicinity extends to the second control vertex from the edit vertex. As applied to FIG. 1, using vertex 110*a* as the edit vertex, the function of FIG. 6*a* affects up to (but not including) control vertex 110*d* in one direction, up to (but not including) control vertex 110*e* in the opposite direction.

The y-axis represents the desired displacement in one dimension applied to the affected control vertices when an edit vertex is displaced. Applied to FIG. 1 with edit vertex 110*a*, when edit vertex 110*a* is repositioned by a displacement of magnitude $d_{110a}$, control vertices 120*d* and 120*e* on either side of vertex 110*a* are repositioned by a displacement of magnitude $d_{120}$.

Functions may be provided for displacements of the affected vertices in other dimensions as well. Based on these functions and on the displacement of the edit vertex, new display positions are estimated for the affected control vertices and, as described above, the control positions of the affected vertices may be adjusted as needed using techniques such as the weighted sum techniques described in the above-referenced papers. Edit offsets, which may be displacement vectors from the old control positions to the new positions, are calculated to reflect the edits.

If desired, the affected vertices determined in step 440 of FIG. 4 may include vertices of the polygonal mesh at a level deeper than the edit level, which may also be repositioned as a result of repositioning the edit vertex. Editing deeper level vertices in the vicinity of the edit vertex can produce a subdivision surface that models the edit more smoothly. For example, referring again to the function shown in FIG. 6*a*, vertices at a deeper level than the edit level and positioned between the edit vertex 110*a* and immediately neighboring control vertices 120*d* and 120*e* may be repositioned as a result of repositioning edit vertex 110*a*.

It is possible, however, that vertices of a deeper level than the edit level do not exist in a specific vicinity around the edit vertex. In this case, new vertices may be created by subdividing the surfaces of interest. For example, referring to FIGS. 1 and 6*b*, if vertices 110*d*, 120*d*, 110*a*, 120*e*, and 110*e* are control vertices and deeper level vertices 130*a* and 130*b* do not exist at the time vertex 110*a* is edited, the polygons in a specific region, such as the region between the edit vertex 110*a* and its immediately neighboring control vertices (the region within ring A in FIG. 1), are subdivided to create vertices at the next level, such as vertices 130*d* and 130*e*.

Figure 6B:
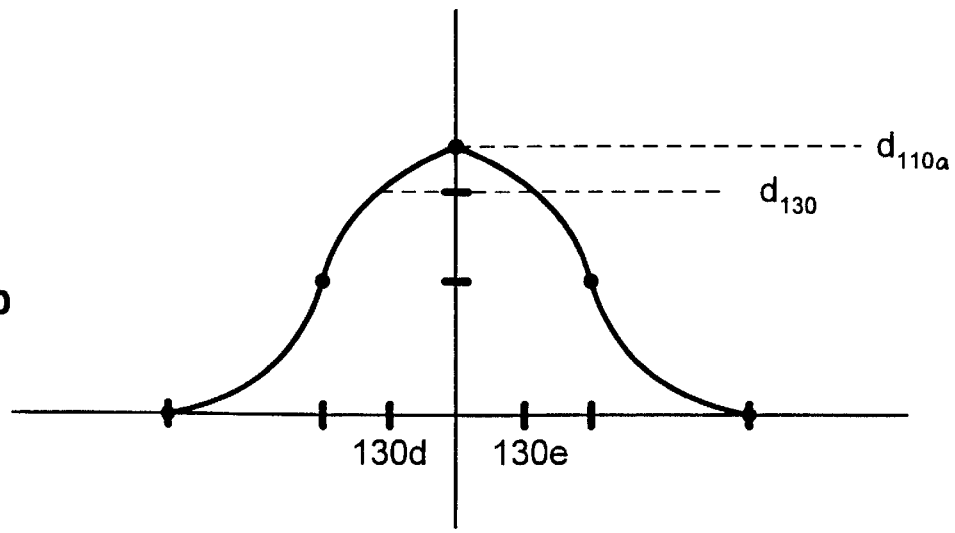

Applying the function of FIG. 6*b* to the mesh of FIG. 1, when vertex 110*a* is displaced by an amount $d_{110a}$, next level vertices 130*d* and 130*e* may be repositioned by displacements of magnitude $d_{130}$. Again, new display positions are estimated, new control positions may be calculated, and edit offsets are calculated and stored.

If desired, vertices of still deeper levels may also be repositioned according to a function such as that illustrated in FIGS. 6*a* and 6*b*.

The affected vertices of the polygonal mesh are updated to reflect the results of the edit (step 450). For example, in the method described above, new control positions were calculated as a result of repositioning the display positions of vertices and edit offsets were calculated to reflect the repositioning. If the positions of vertices of the polygonal mesh are stored in global coordinates, the positions after an edit can be calculated based on the edit offsets. For example, if an edit offset for a repositioned vertex is the displacement vector from its old control position to a new control position, the displacement vector can be added to the vertex position in the polygonal mesh to derive an updated vertex position. Alternatively, if the positions of vertices of the polygonal mesh are stored in local coordinates, the local positions may be updated using the displacement vectors.

As discussed above, the polygonal mesh and a surface rendered by applying a subdivision scheme to the polygonal mesh may be simultaneously displayed. Accordingly, when a vertex is edited, the corresponding rendered surface display is updated (step 460). Because the effect of an edit is limited to a limited vicinity around the edited vertex, only the surface corresponding to the affected vicinity is re-rendered.

The polygons forming the portion of the surface to be re-rendered may be determined using various techniques. For example, each vertex edited as a result of an edit may be tagged. As discussed above, a possible data structure for vertices of the polygonal mesh stores pointers which allows the polygons of the mesh to be traversed, and those polygons having a tagged vertex may also be tagged. Only these tagged polygons are re-rendered in the surface.

Each tagged polygon is rendered by tessellating its surface. The specific tessellation technique may vary. For example, a default value may be set for defining how finely the surface is tessellated. However, depending on the user's edit, it may be desirable to tessellate the surface to a variable degree.

For example, using the display positions of the tagged vertices, a threshold test may compare the normal of the edit vertex to the normals of the control vertices immediately neighboring the edit vertex. Based on this comparison, a finer degree of tessellation may be applied if the normals differ by more than a predetermined threshold. The specific threshold may be fixed, or it may be changed depending on the viewing distance or the relative size of the object on the screen.

Another example of a threshold test compares the tangents of the edit vertex and neighboring control vertices at their display positions. This test may provide more accurate results when a repositioned edit vertex falls on a crease edge, in which case the normal of the edit vertex may be discontinuous. If the tangents differ by more than a predetermined threshold, a finer degree of tessellation may be applied.

Furthermore, additional tessellation may be desirable to prevent cracks from appearing in the rendered surface between adjacent polygons. If all of the tagged polygons adjacent to a tagged polygon p are of the same or coarser level, polygon p is rendered using a subdivision scheme as described above. However, if an adjacent tagged polygon is subdivided at a finer level than tagged polygon p, cracks are likely to appear at their shared edge.

Figure 7A:
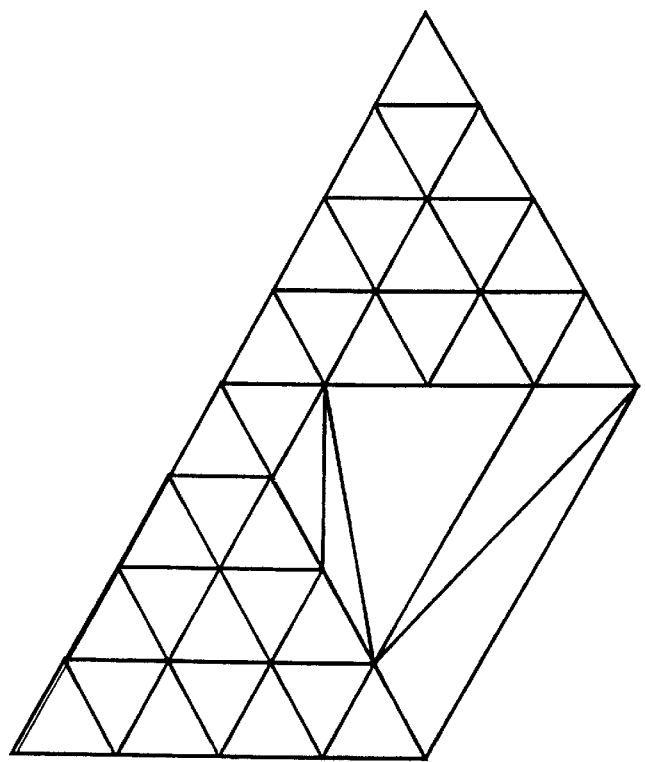
FIGS. 7a and 7b show examples of irregular tessellation.
Figure 7B:
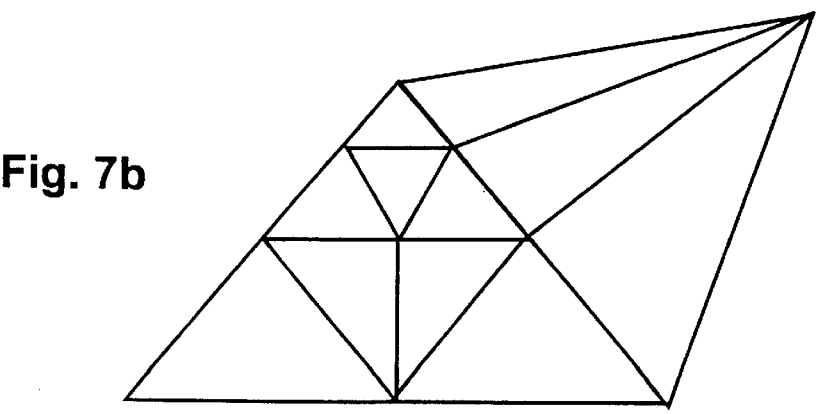

Various methods may be used for avoiding such cracks. For example, extra vertices may be added to the coarser level polygon by performing an irregular tessellation. Specifically, if a polygon p has a tagged neighbor that is more finely subdivided, additional polygons may be created in the polygon p based on the finer level vertices of the neighbor positioned on the edge between that marked neighbor and polygon p. FIGS. 7a and 7b show examples of created triangle fans. The specific method of creating the triangle fans may be adapted as needed for specific applications. Polygon p, as modified, is then re-rendered.

The invention may be implemented in digital hardware or computer software, or a combination of both. Preferably, the invention is implemented in a computer program executing in a computer system. Such a computer system may include a processor, a data storage system, at least one input device, and an output device.

Figure 8:
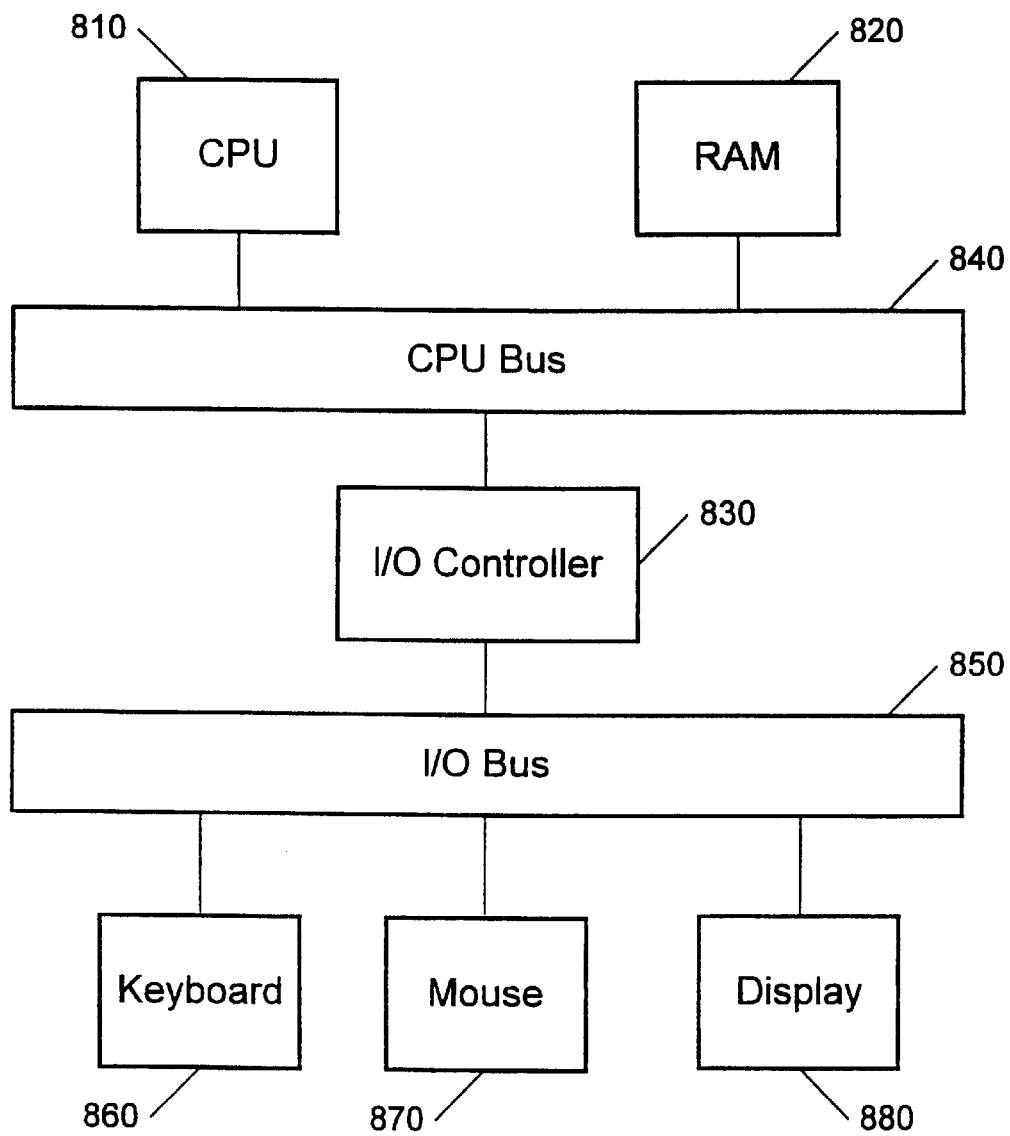
FIG. 8 illustrates a computer system.

FIG. 8 illustrates one such computer system 800, including a CPU 810, a RAM 820, and an I/O controller 830 coupled by a CPU bus 840. The I/O controller 830 is also coupled by an I/O bus 850 to input devices such as a keyboard 860 and a mouse 870, and output devices such as a monitor 880.

Other embodiments are within the scope of the following claims. For example, the invention may be implemented using polygonal shapes other than triangles, such as quads (four-sided polygons). Various data structures may be used for representing the polygonal mesh and various subdivision schemes may be used to render surfaces from the mesh. The mesh may be edited by editing edges rather than vertices. Various methods of recording edit offsets, and various methods for rendering the subdivision surface and avoiding cracks after user edits may be used.

What is claimed is:

1. A computer-implemented method for editing a curved surface defined by mesh elements, the method comprising:

displaying curved surface points having surface locations and rendered from a polygonal mesh of the mesh elements having specified levels of detail where the mesh elements have mesh element locations allowed to be different from the surface locations of the corresponding curved surface points;

selecting a mesh element displayed in the curved surface;

determining a specified vicinity comprised of mesh elements associated with the specified selected mesh element, wherein the specified vicinity corresponds to the level of detail of the selected mesh element, adjacent elements and non-adjacent elements;

editing the selected mesh element in response to user input; and editing the specified vicinity of associated mesh elements and finer levels of detail associated with the selected mesh element based on the edited mesh element and preserving surface continuity.

2. The method of claim 1, wherein the mesh element comprises a vertex.

3. The method of claim 1, further comprising updating the displayed surface to reflect the edited mesh elements of the polygonal mesh.

4. The method of claim 3, wherein updating the displayed surface further comprises:

defining an edit portion of the polygonal mesh including the edited mesh elements;

re-rendering a portion of the surface corresponding to the edit portion of the polygonal mesh; and updating the displayed surface by including the re-rendered portion.

5. The method of claim 4, wherein re-rendering the portion of the surface includes performing an irregular tessellation of at least part of the re-rendered portion.

6. The method of claim 1, further comprising determining an edit level corresponding to the selected mesh element level of detail, wherein the selected mesh element and the associated mesh elements are mesh elements of at least the edit level.

7. The method of claim 6, wherein the associated mesh elements include mesh elements selected from a finer level of detail than the edit level.

8. The method of claim 7, wherein the associated mesh elements from the finer level are within a smaller vicinity contained within the specified vicinity.

9. The method of claim 8, wherein determining the associated mesh elements from the finer level within the smaller vicinity further comprises:

determining whether mesh elements from the polygonal mesh at the finer level exist within the smaller vicinity; and if such mesh elements do not exist:
   creating such mesh elements; and
   adding the created mesh elements to the polygonal mesh.

10. The method of claim 6, wherein the surface rendered from the polygonal mesh is displayed at the edit level.

11. The method of claim 10, further comprising highlighting the mesh elements at the edit level displayed in the rendered surface.

12. The method of claim 1, further comprising receiving user input defining a new position for the selected mesh element, wherein editing the selected mesh element in response to user input repositions the selected mesh element to the user-defined new position, and editing the associated mesh elements repositions the associated mesh elements based on the new position of the selected mesh element.

13. The method of claim 12, wherein repositioning the associated mesh elements is further based on a predetermined function.

14. The method of claim 1, wherein each mesh element has a continuity type, the method further comprising receiving user input defining a new continuity type for the selected mesh element, wherein editing the selected mesh element in response to user input sets a continuity type of selected mesh element to the new continuity type, and editing the associated mesh element sets a continuity type for the associated mesh element based on the new continuity type of selected mesh element.

15. The method of claim 1, wherein the selected mesh element is selected in response to user input.

16. The method of claim 1, wherein the polygonal mesh comprises a set of connected triangles.

17. The method of claim 1, wherein the polygonal mesh comprises a set of connected quads.

18. A memory device storing computer-readable instructions for use in a computer system for editing a curved surface defined by mesh elements, the device comprising:
   instructions for displaying curved surface points having surface locations and rendered from a polygonal mesh of the mesh elements having specified levels of detail where the mesh elements have mesh element locations allowed to be different from the surface locations of the corresponding curved surface points;
   instructions for selecting a mesh element displayed in the surface;
   instructions for determining a specified vicinity comprised of mesh elements associated with the selected mesh element, wherein the specified vicinity corresponds to the level of detail of the selected mesh element, adjacent elements and non-adjacent elements;
   instructions for editing the selected mesh element in response to user input; and
   instructions for editing the specified vicinity of associated mesh elements and finer levels of detail associated with the specified vicinity based on the edited mesh element and preserving surface continuity.

19. The memory device of claim 18, further comprising instructions for updating the displayed surface to reflect the edited mesh elements of the polygonal mesh.

20. The memory device of claim 19, wherein instructions for updating the displayed surface further comprise:
   instructions for defining an edit portion of the polygonal mesh including the edited mesh elements;
   instructions for re-rendering a portion of the surface corresponding to the edit portion of the polygonal mesh; and
   instructions for updating the displayed surface by including the re-rendered portion.

21. The memory device of claim 18, further comprising instructions for receiving user input defining a new position for the selected mesh element, wherein instructions for editing the selected mesh element in response to user input reposition the selected mesh element to the new position, and instructions for editing the associated mesh elements reposition the associated mesh elements based on the new position of the selected mesh element.

22. A computer-implemented method for editing a three-dimensional curved surface object model defined by mesh elements with the object model having surface points having surface locations and rendered from a polygonal mesh of the mesh elements having a hierarchy of levels of detail where the mesh elements have mesh element locations allowed to be different from the surface locations of the corresponding curved surface object model, the method comprising:
   allowing selection for editing any of the levels of detail in the hierarchy;
   receiving input defining changes to a specified vicinity, the specified vicinity being comprised of mesh elements, adjacent mesh elements and non-adjacent mesh elements that correspond to one or more levels of detail which include the selected level of detail and finer levels of detail than the selected level of detail; and
   modifying the specified vicinity based on the received input and preserving surface continuity.

23. The method of claim 22, wherein details of finer levels of detail in the hierarchy are stored within the coarser levels of detail.

24. The method of claim 23, wherein details comprise information defining the finer levels of detail.

25. The method of claim 22, wherein allowing selection for editing any of the levels of detail in the hierarchy comprises:
   allowing display of the model; and
   allowing user manipulation of an input device to select the level of detail of the model.

26. The method of claim 25, wherein the input device comprises a computer mouse.

27. The method of claim 22, wherein receiving input defining changes to the specified vicinity comprises manipulating an input device.

28. The method of claim 27, wherein the input device comprises a computer mouse.

29. The method of claim 22, wherein input comprises changing a mesh element continuity type that indicates a direction and a magnitude of a derivative at a point in the mesh element.

30. The method of claim 22, wherein input comprises changing a position of a mesh element.

31. The method of claim 22, wherein receiving input defining changes to the specified vicinity comprises selecting a mesh element.

32. The method of claim 31, wherein receiving input defining changes to the specified vicinity comprises determining mesh elements associated with the selected mesh element.

33. The method of claim 32, wherein modifying the specified vicinity comprises editing the selected mesh element.

34. The method of claim 33, wherein edits to the selected mesh element affect the associated mesh elements.

35. The method of claim 34, wherein affected mesh elements are updated to reflect the mesh element editing.

36. The method of claim 22, wherein modifying the specified vicinity comprises subdivision in the specified vicinity.

37. The method of claim 36, wherein specified vicinity subdivision comprises creating new mesh elements in the specified vicinity.

38. The method of claim 22, wherein the specified vicinity indicates the selected level of detail.

39. The method of claim 22, wherein modifying the specified vicinity comprises updating the object model.

40. The method of claim 22, wherein a mesh element stores information about finer levels of detail than a level of detail associated with the mesh element.

41. The method of claim 22, wherein modifying the specified vicinity comprises displaying a new model corresponding to changes to the specified vicinity.

* * * * *